Feb. 16, 1926.
P. F. MORRISSEY
HOLDER FOR LICENSE AND CITY NAME PLATES
Filed Oct. 14, 1924
1,573,087
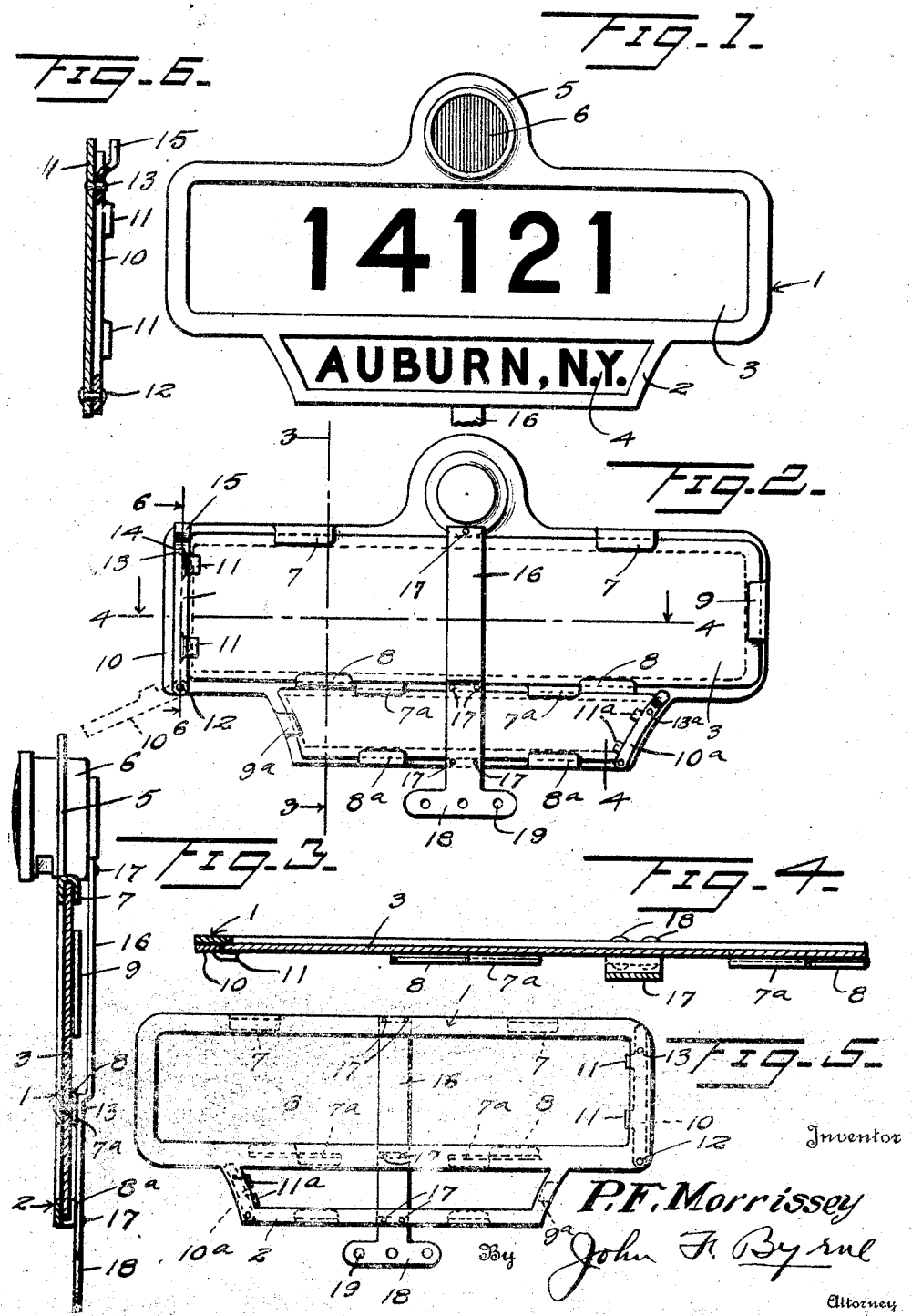

Patented Feb. 16, 1926.

1,573,087

UNITED STATES PATENT OFFICE.

PATRICK F. MORRISSEY, OF AUBURN, NEW YORK.

HOLDER FOR LICENSE AND CITY NAME PLATES.

Application filed October 14, 1924. Serial No. 743,616.

*To all whom it may concern:*

Be it known that I, PATRICK F. MORRISSEY, a citizen of the United States, residing at Auburn, in the county of Cayuga and State of New York, have invented certain new and useful Improvements in Holders for License and City Name Plates, of which the following is a specification.

This invention relates to license plate holders, and has for one of its objects the provision of a device of this character adapted to permit a license plate to be easily and quickly secured thereto.

A further object of the invention is the provision of a holder of the character stated adapted to carry, in addition to the license plate, a city name plate and in some instances a tail lamp.

A further object of the invention is the provision of a holder of the character stated which shall be simple, durable and efficient, and which may be manufactured and sold at a comparatively low cost.

With the above and other objects in view, the invention consists in the construction, combination and arrangement of parts hereinafter fully described and claimed, and illustrated in the accompanying drawing, wherein:—

Figure 1 is a view in elevation of the license and city name plate holder constructed in accordance with my invention, Figure 2 is a view similar to Figure 1, looking at the reverse side of the holder, Figure 3 is a sectional view taken on the plane indicated by the line 3—3 of Figure 2, Figure 4 is a sectional view taken on the plane indicated by the line 4—4 of Figure 2, Figure 5 is a view in elevation of a slightly modified form of the holder, and Figure 6 is a detail sectional view taken on the plane indicated by the line 6—6 of Figure 2.

As shown in the drawing, the holder comprises a main frame 1 and a secondary frame 2. The frame 1 is adapted to carry a license plate 3 and the frame 2 a city name plate 4. The frame 2 is formed integrally with and depends from the bottom bar of the frame 1. An extension 5, which is preferably of annular formation and which carries a tail lamp 6, projects upwardly from and forms an integral part of the top bar of the frame 1. The frames 1 and 2 and the extension 5 may be and preferably are struck up from light sheet metal. The frame 2 and the extension 5 are located centrally between the end bars of the frame 1.

To retain the license plate 3 in place, the top bar of the frame 1 is provided with lugs 7, the bottom bar with lugs 8, one end bar with a lug 9, and the other end bar with a latch bar 10 which is provided with lugs 11. All of these parts are located at the rear side of the frame 1, the lugs 7, 8 and 9 are formed integrally with the frame 1, and the lugs 11 are formed integrally with the latch bar 10. The lugs are spaced from the rear side of the frame 1, and the license plate 3 occupies a position between them and the frame. The lugs hold the license plate 3 in firm contact with the inner side of the frame 1, and they together with the latch bar 10 prevent the license plate from having any horizontal or vertical movement with respect to the frame. The latch bar 10 is made of spring metal, and is pivoted at one end to the frame 1 as indicated at 12. When in closed position the latch bar 10 contacts with the frame 1, and it is held in this position by a pin 13 carried by the frame and passing through an opening 14 in the latch bar. The free end of the latch bar 10 is provided with a finger piece 15 by means of which it may be sprung laterally to engage it with or disengage it from the pin 13 when it is desired to secure it in closed position or free it into opened position, the opened position of the latch bar being indicated by dotted lines in Figure 2. When the latch bar 10 is in opened position a license plate may be readily applied to the holder by inserting it, in an endwise direction, between the frame 1 and the parts 7, 8 and 9 from the end of the holder carrying the latch bar 10. To secure the license plate in place, it is only necessary to swing the latch bar 10 into closed position and secure it in said position by engaging it with the pin 13. The elasticity of the latch bar 10 prevents it from becoming accidentally disengaged from the pin 13.

The frame 2 is provided with similar elements for securing the city name plate 4 in place, and these elements are designated $7^a$, $8^a$, $9^a$, $10^a$, $11^a$ and $13^a$, respectively.

The holder is adapted to be secured to the rear end of an automobile by means of a bar or bracket 16 which is attached to the holder by rivets 17 and which extends below the frame 2 and terminates in a head 18. This head is provided with openings 19 for the reception of attaching bolts, rivets or the like.

In Figure 5, there is shown a slightly modified form of the holder. This holder is adapted to be secured to the front end of the automobile, and differs from the holder shown in Figures 1 to 4 only in that it is not provided with means for supporting or carrying a lamp.

From the foregoing description, taken in connection with the accompanying drawing, it will be seen that the license and city plates may be easily and quickly secured to the holder without the use of screws or bolts. It will also be seen that the license and city plates may be quickly removed when occasion requires. To secure the license and city plates in the holder, it is only necessary to secure the latch bars 10 and 10ª in closed position, and to free the plates for removal it is only necessary to swing the latch bars 10 and 10ª into opened position.

While I have herein shown and described the preferred form of my invention by way of illustration, I wish it to be understood that I do not limit or confine myself to the precise details of construction herein described and shown, as modifications and variations may be made within the scope of the claims without departing from the spirit of the invention.

What is claimed is:—

1. A holder for an automobile license plate, comprising an open frame having integrally formed top, bottom and end bars, license plate retaining lugs on the top, bottom and one end bar, and a latch carried by the other end bar and provided with license plate retaining lugs.

2. A holder for an automobile license and a city name plate, comprising top, intermediate and bottom bars, said top and intermediate bars being of the same length and the bottom bar being shorter than the others, end bars formed integrally with said top and intermediate bars and forming in conjunction therewith an open frame for the license plate, other end bars spaced inwardly from said first named end bars and formed integrally with said intermediate and bottom bars, said intermediate, bottom and last named end bars forming an open frame for the city name plate, means adapted to secure said plates to a common side of said frames, and a bracket bar secured to the top, intermediate and bottom bars.

In testimony whereof I affix my signature.

PATRICK F. MORRISSEY.